(12) United States Patent
DeMeter et al.

(10) Patent No.: US 7,524,390 B2
(45) Date of Patent: Apr. 28, 2009

(54) FIXTURE AND METHOD OF HOLDING AND DEBONDING A WORKPIECE WITH THE FIXTURE

(75) Inventors: Edward C. DeMeter, State College, PA (US); R. Michael Powell, Hickory, NC (US)

(73) Assignee: The Penn State Research Foundation, University Park, PA (US)

( * ) Notice: Subject to any disclaimer, the term of this patent is extended or adjusted under 35 U.S.C. 154(b) by 273 days.

(21) Appl. No.: 11/460,159

(22) Filed: Jul. 26, 2006

(65) Prior Publication Data

US 2007/0221328 A1   Sep. 27, 2007

Related U.S. Application Data

(60) Provisional application No. 60/786,271, filed on Mar. 27, 2006.

(51) Int. Cl.
*B32B 38/10* (2006.01)
(52) U.S. Cl. ............... 156/247; 156/73.6; 156/344; 156/584; 269/55; 269/289 R; 269/296
(58) Field of Classification Search ............... 156/73.6, 156/247, 344, 584; 269/50, 51, 55, 289 R, 269/296
See application file for complete search history.

(56) References Cited

U.S. PATENT DOCUMENTS

| | | | |
|---|---|---|---|
| 2,450,482 A | 10/1948 | Morin | |
| 2,463,065 A | 3/1949 | Stevenson | |
| 2,527,856 A | 10/1950 | Sido et al. | |
| 2,606,482 A | 8/1952 | Sorensen et al. | |

(Continued)

FOREIGN PATENT DOCUMENTS

DE   19920365 A1   11/2000

(Continued)

OTHER PUBLICATIONS

Paul F. Jacobs, Society of Manufacturing Engineers, "Stereolithography and other RP&M Technologies", Table 2-5. Photopolymer Systems for SLA and Their Typical Properties, ASME Press, 1996, pp. 74, 75.

(Continued)

*Primary Examiner*—Mark A Osele
(74) *Attorney, Agent, or Firm*—Howard & Howard Attorneys PLLC

(57) ABSTRACT

A fixture for holding a workpiece during a manufacturing process includes a base and a rod received by and moveable relative to the base. The rod includes a proximal end presenting a bonding surface. Adhesive establishes an adhesive bond extending between and bonding to the bonding surface and the workpiece. The bonding surface is moveable with the rod relative to the base in an adhesive bond destroying motion. A method of holding the workpiece on the fixture includes the step of adjoining the adhesive to the bonding surface and to the workpiece to create the adhesive bond between the bonding surface and the workpiece during the manufacturing process. The method also includes the step of displacing the bonding surface relative to the base and relative to the workpiece to destroy the adhesive bond between the bonding surface and the workpiece after the manufacturing process has been performed on the workpiece.

32 Claims, 5 Drawing Sheets

U.S. PATENT DOCUMENTS

| | | | |
|---|---|---|---|
| 2,911,348 A * | 11/1959 | Rupert | 204/623 |
| 2,937,437 A | 5/1960 | Cole et al. | |
| 3,608,809 A | 9/1971 | Cushman | |
| 3,834,687 A | 9/1974 | Martin et al. | |
| 3,868,118 A | 2/1975 | Hirvi et al. | |
| 3,963,551 A | 6/1976 | Marlinski | |
| 4,082,423 A | 4/1978 | Glista et al. | |
| 4,255,216 A | 3/1981 | Conant et al. | |
| 4,356,050 A | 10/1982 | Crivello et al. | |
| 4,492,513 A | 1/1985 | Weck et al. | |
| 4,536,238 A | 8/1985 | Dischert | |
| 4,642,221 A | 2/1987 | Hansen et al. | |
| 4,668,546 A | 5/1987 | Hutter, III | |
| 4,685,660 A | 8/1987 | Dillner | |
| 4,695,705 A | 9/1987 | Kulig | |
| 4,697,966 A | 10/1987 | Bauer | |
| 4,729,804 A | 3/1988 | Dillner | |
| 4,737,417 A | 4/1988 | Mushardt et al. | |
| 4,777,463 A | 10/1988 | Cory et al. | |
| 4,778,702 A | 10/1988 | Hutter, III | |
| 4,822,656 A | 4/1989 | Hutter, III | |
| 4,842,912 A | 6/1989 | Hutter, III | |
| 4,853,064 A | 8/1989 | Levine | |
| 4,933,042 A | 6/1990 | Eichelberger et al. | |
| 5,007,975 A | 4/1991 | Yamamoto et al. | |
| 5,115,761 A | 5/1992 | Hood | |
| 5,210,926 A | 5/1993 | Newton | |
| 5,380,387 A | 1/1995 | Salamon et al. | |
| 5,423,931 A | 6/1995 | Inoue et al. | |
| 5,558,744 A | 9/1996 | Rock et al. | |
| 5,590,870 A | 1/1997 | Goeliner | |
| 5,624,521 A | 4/1997 | Hed | |
| 5,904,149 A * | 5/1999 | Ruhl et al. | 132/73 |
| 5,947,662 A | 9/1999 | Becker et al. | |
| 5,981,361 A | 11/1999 | Yamada | |
| 6,073,451 A | 6/2000 | Tarumizu | |
| 6,136,141 A | 10/2000 | Glatfelter et al. | |
| 6,331,080 B1 | 12/2001 | Cole et al. | |
| 6,458,234 B1 | 10/2002 | Lake et al. | |
| 6,503,356 B1 * | 1/2003 | Sakai et al. | 156/247 |
| 6,524,433 B2 | 2/2003 | Sweeney, Jr. | |
| 6,550,124 B2 | 4/2003 | Krajewski et al. | |
| 6,647,611 B2 | 11/2003 | Zhang | |
| 6,652,707 B2 | 11/2003 | Ishang et al. | |
| 6,780,484 B2 | 8/2004 | Kobe et al. | |
| 6,860,534 B2 | 3/2005 | Vogel | |
| 7,036,810 B2 * | 5/2006 | Wal, III | 269/296 |
| 7,172,676 B2 | 2/2007 | DeMeter | |
| 7,270,735 B2 | 9/2007 | Steele et al. | |
| 2003/0062115 A1 | 4/2003 | Sakai et al. | |
| 2005/0000636 A1 | 1/2005 | Geiger et al. | |
| 2008/0011416 A1 | 1/2008 | DeMeter | |

FOREIGN PATENT DOCUMENTS

| | | |
|---|---|---|
| DE | 10029682 C1 | 12/2001 |
| EP | 0587305 A2 | 3/1994 |
| JP | 6155117 A | 6/1994 |
| WO | 03057392 A1 | 7/2003 |

OTHER PUBLICATIONS

Andrew G. Bachmann, Dymax Corporation, "Advances in Light Curing Adhesive", Presented at SPIE, San Diego, CA, Aug. 1, 2001 Paper #444-20.

Sung H. Ahn, Paul K. Wright, "Reference Free Part Encapsulation (RFPE): An Investigation of Material Properties and the Role of RFPE in a Taxonomy of Fixturing Systems", Journal of Manufacturing Systems, vol. 21/No. 2, 2002, pp. 101-110.

Erland M. Schulson, "The Structure and Mechanical Behavior of Ice", JOM 51(2)(1999), pp. 21-27.

Paul F. Jacobs, David T. Reid, "Rapid Prototyping & Manufacturing—Fundamentals of StereoLithography", Society of Manufacturing Engineers, 1992, pp. 25-58, 79-110.

A. Felix, S.N. Melkote, "Effect of Workpiece Surface Topography on the Holding Force In A Electromagnetic Chuck", Paper, The George W. Woodruff School of Mechanical Engineering, George Institute of Technology, Elsevier Science Ltd, 2000.

E. Paul DeGarmo, JT Black, Ronald A. Kosher, "Other Workholding Devices", Materials and Processing in Manufacturing, Eighth Edition, Prentice Hall, 1997, ISBN 0-02-328621-0, pp. 838-840.

International Search Report and Written Opinion dated Jul. 3, 2008 for International Application No. PCT/US2007/007461, filed Mar. 26, 2007.

* cited by examiner

FIXTURE AND METHOD OF HOLDING AND DEBONDING A WORKPIECE WITH THE FIXTURE

CROSS REFERENCE TO RELATED APPLICATION

This application claims the benefit of Provisional Application Ser. No. 60/786,271 filed Mar. 27, 2006.

BACKGROUND OF THE INVENTION

1. Field of the Invention

The present invention relates to a fixture for holding a workpiece during a manufacturing process and a method of holding the workpiece on the fixture and debonding the workpiece from the fixture.

2. Description of the Related Art

A workpiece is generally held by a fixture during a manufacturing process. The fixture supports the workpiece and holds the workpiece in place during the manufacturing process. The manufacturing process may be automated and includes machining, inspection, assembly, and the like. The fixture is reusable to perform the manufacturing process individually for a plurality of workpieces such that after the manufacturing process has been performed to one workpiece, another workpiece may be disposed on and held by the fixture. The fixture is capable of consistently holding each workpiece such that the manufacturing process is consistent among the plurality of workpieces.

The workpiece must be securely held to the fixture during the manufacturing process such that the manufacturing process is consistently performed to each workpiece. The workpiece must also be quickly and easily removed from the fixture to reduce the time required to perform the manufacturing process.

It is known in the art to use clamps to hold the workpiece stationary relative to the fixture. The clamps exert pressure on the workpiece to mechanically hold the workpiece in place relative to the fixture. The clamps securely hold the workpiece to the fixture and allow for quick and easy removal of the workpiece from the fixture. However, because the clamps exert pressure on the workpiece, the clamps have a tendency to cause permanent deformation or fracture of the workpiece. The clamps also have a tendency to obstruct the access to the workpiece during the manufacturing process.

It is also known in the art to use adhesive to hold the workpiece relative to the fixture. The adhesive is applied to the fixture and the workpiece is positioned in contact with the adhesive to create an adhesive bond to adhere the workpiece to the fixture. The adhesive securely holds the workpiece to the fixture and does not obstruct access to the workpiece. After the manufacturing process, the adhesive bond between the workpiece and the fixture is destroyed by applying force by direct contact to the workpiece with a hand-held tool such as a hammer or a pry bar. The force applied by direct contact with the hand-held tool moves the workpiece relative to the fixture. The application of force by direct contact with the hand-held tool has a tendency to cause permanent deformation or fracture of the workpiece. Specifically, the hand-held tool is formed from a material harder than the workpiece and the hand-held tool dents, scratches, and/or cuts the surface of the workpiece. The use of a hand-held tool also creates torsion in the workpiece, i.e. twists the workpiece about an axis of the workpiece, leading to deformation or fracture of the workpiece. In addition, difficulties arise in applying force to a consistent region of each of the workpieces. Application of force to a weak region of the workpiece leads to fracture of the workpiece.

It is also known in the art to expose the adhesive to a chemical debonder to chemically destroy the adhesive bond. Chemical debonding is time consuming because the chemical debonder must contact and break down the chemical makeup of the adhesive. Chemical debonding is also often physically or economically impractical due to the size or shape of the workpiece, the size and location of the adhesive between the workpiece and the fixture, and the amount of chemical debonder required to destroy the adhesive bond.

Accordingly, it would be desirable to manufacture a fixture that holds a workpiece for a manufacturing process with the use of adhesive and that is capable of quickly and easily debonding the workpiece from the fixture without causing permanent deformation or fracture of the workpiece. It would also be desirable to introduce a method of holding the workpiece relative to the fixture for a manufacturing process and debonding the workpiece from the fixture after the manufacturing process without causing permanent deformation or fracture of the workpiece as a result of the debonding.

SUMMARY OF THE INVENTION AND ADVANTAGES

The present invention is a fixture for holding a workpiece during a manufacturing process. The fixture includes a base and a rod. The rod is received by and moveable relative to the base. The rod includes a proximal end presenting a bonding surface for receiving an adhesive such that the adhesive establishes an adhesive bond extending between and bonding to the bonding surface and the workpiece. The bonding surface is moveable with the rod relative to the base in an adhesive bond destroying motion for displacing the bonding surface relative to the workpiece to destroy the adhesive bond between the bonding surface and the workpiece.

Additionally, the present invention is method of holding the workpiece on the fixture. The method includes the step of adjoining adhesive to the bonding surface. The method further includes the step of adhering the adhesive to the bonding surface and to the workpiece to create an adhesive bond between the bonding surface and the workpiece to hold the workpiece during the manufacturing process. The method also includes the step of displacing the bonding surface relative to the base and relative to the workpiece to destroy the adhesive bond between the bonding surface and the workpiece.

Accordingly, the fixture securely holds the workpiece during the manufacturing process because the workpiece is adhered to the bonding surface. Because the bonding surface is moveable relative to the base and the workpiece in an adhesive bond destroying motion, the workpiece is quickly and easily removable from the fixture. Specifically, the adhesive bridges between the bonding surface and the workpiece. The adhesive bond destroying motion of the bonding surface relative to the workpiece results in stress on the adhesive bond to destroy the adhesive bond. Additionally, the method provides for the holding of the workpiece during the manufacturing process and the quick and easy removal of the workpiece from the fixture. Because the bonding surface is displaced relative to the base and the workpiece, the workpiece is quickly and easily debonded from the fixture. Specifically, the step of displacing the bonding surface relative to the base and the workpiece results in stress on the adhesive to destroy the adhesive bond.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
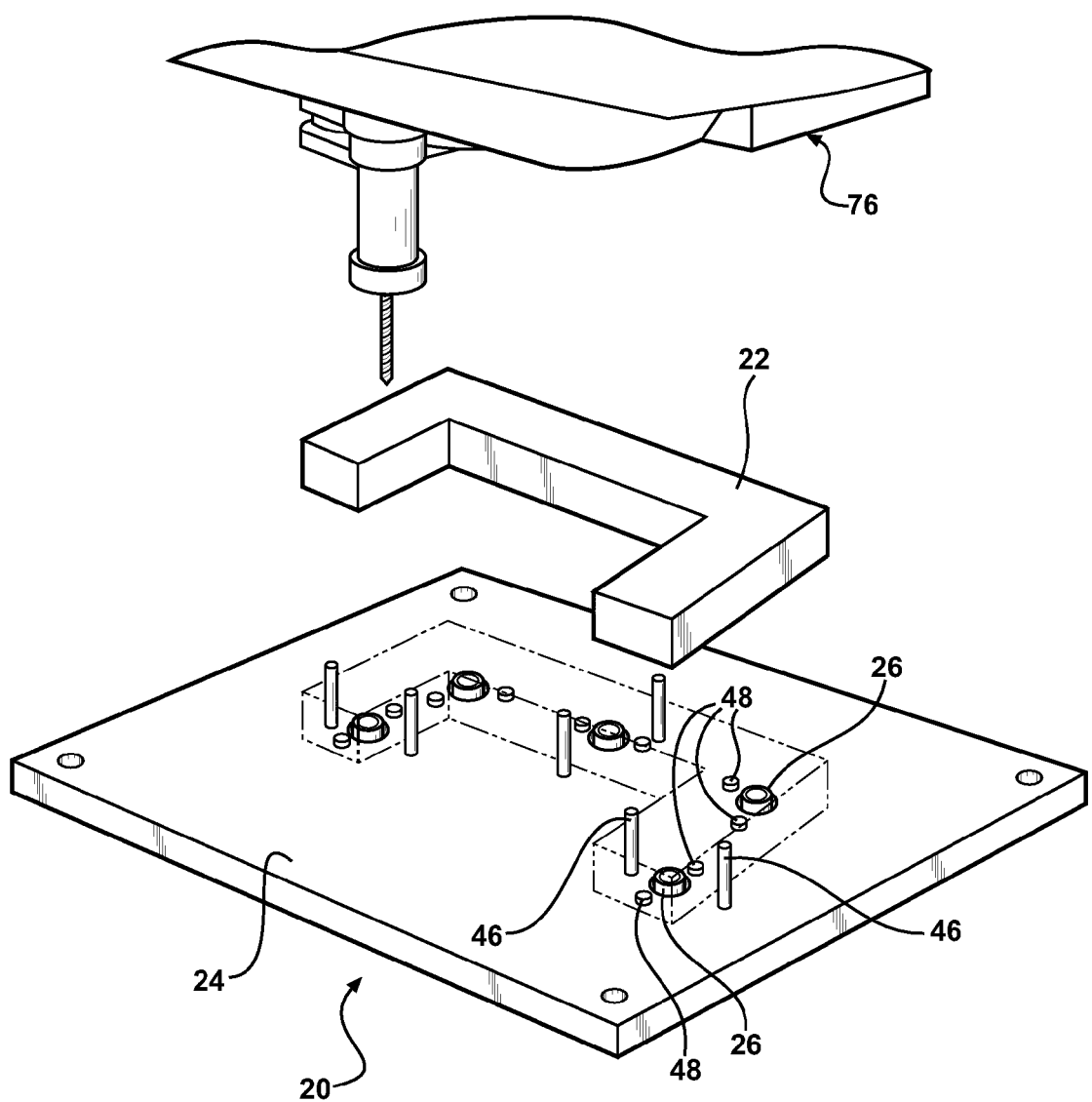
FIG. 1 is a perspective view of a fixture including a base and a plurality of rods wherein each of the rods is moveable relative to the base.

Referring to the Figures, wherein like numerals indicate corresponding parts throughout the several views, a fixture 20 is generally shown for holding a workpiece 22 during a manufacturing process. As shown in FIG. 1, the manufacturing process could be performed with a machining center 76. The fixture 20 is maintained stationary relative to the machining center 76. It should be appreciated that the workpiece 22 shown in FIG. 1 is depicted as a general shape for exemplary purposes and may include any shape workpiece 22. The fixture 20 includes a base 24 and a rod 26. The rod 26 is also known to one skilled in the art as a gripper pin. The fixture 20 may include one rod 26, or alternatively, as shown in FIG. 1, the fixture 20 may include a plurality of rods 26.

The rod 26 includes a proximal end 28 presenting a bonding surface 30 for receiving an adhesive 32 such that the adhesive 32 establishes an adhesive bond extending between and bonding to the bonding surface 30 and the workpiece 22. The adhesive bond between the bonding surface 30 and the workpiece 22 maintains the workpiece 22 in position relative to the base 24 such that the manufacturing process may be performed on the workpiece 22. Specifically, the adhesive 32 maintains the workpiece 22 in position relative to the base 24 while minimizing the obstruction of access to the workpiece 22. As shown in the Figures, the bonding surface 30 is preferably planar; however, it should be appreciated that the bonding surface 30 may be of any configuration such that the bonding surface 30 receives adhesive 32. For example, the bonding surface 30 may be cylindrically-shaped or spherically-shaped.

The manufacturing process includes, for example, high volume machining; however, it should be appreciated that the fixture 20 is not limited to use in such a manufacturing process and, for example, may be used in any type of machining, assembly, inspection, and the like. High volume machining, for example, is performed with a four-axis machining center with pallet sweep capability.

The rod 26 is received by and moveable relative to the base 24 and the workpiece 22 is maintained stationary relative to the base 24. The bonding surface 30 is moveable with the rod 26 relative to the base 24 in an adhesive bond destroying motion for displacing the bonding surface 30 relative to the workpiece 22 to destroy the adhesive bond between the bonding surface 30 and the workpiece 22. In other words, because the workpiece 22 is stationary relative to the base 24, displacement of the bonding surface 30 relative to the base 24 results in displacement of the bonding surface relative to the workpiece 22. This displacement of the bonding surface 30 relative to the workpiece 22 is an adhesive bond destroying motion.

Specifically, the adhesive 32 bridges between the bonding surface 30 and the workpiece 22 and the movement of the bonding surface 30 relative to the workpiece 22 results in stress on the adhesive 32 to destroy the adhesive bond of the adhesive 32. The destruction of the adhesive bond results in the debonding of the workpiece 22 from the fixture 20. The adhesive bond destroying motion is any motion that moves or changes the placement of the rod 26 relative to the base 24 in a way that exerts stress on the adhesive 32 to destroy the adhesive bond. For example, and as will be described below, the adhesive bond destroying motion may be rotational motion, translational motion, vibrational motion, or any combination thereof.

Preferably, the base 24 defines a bore 34 and the rod 26 extends along an axis A and is disposed in the bore 34. As shown in FIG. 1, the base 24 is in the form of a subplate such that the subplate defines the bore 34 and the rod 26 is received by the subplate in the bore 34. In such a configuration, the rod 26 is moved relative to the base 24 by, for example, a motor 76 coupled to the rod 26. For example, the motor 76 is a pneumatic motor, a hydraulic motor, or an electric motor. It should be appreciated that the base 24 is not limited to the subplate and, for example, the base 24 may be in the form of the motor 76 coupled to a surface of the subplate such that the motor 76 defines the bore 34 and the rod 26 is received by the motor 76 in the bore 34.

As shown in FIG. 1, the rod 26 extends from the base 24 presenting the bonding surface 30 spaced from the base 24. For example, as shown in FIG. 1, the rod 26 is cylindrical and presents a cylindrical side and a proximal end 28. The cylindrical side extends partially into the bore 34 and extends partially from the bore 34 to present the proximal end 28 spaced from the surface of the base 24. The proximal end 28 presents the bonding surface 30. The bore 34 is cylindrical to correspond to the shape of the rod 26 such that the rod 26 is moveable in the bore 34. It should be appreciated that the rod 26 and the bore 34 are not limited to a cylindrical shape but may be any shape such that the rod 26 is moveable in the bore 34.

Figure 5:
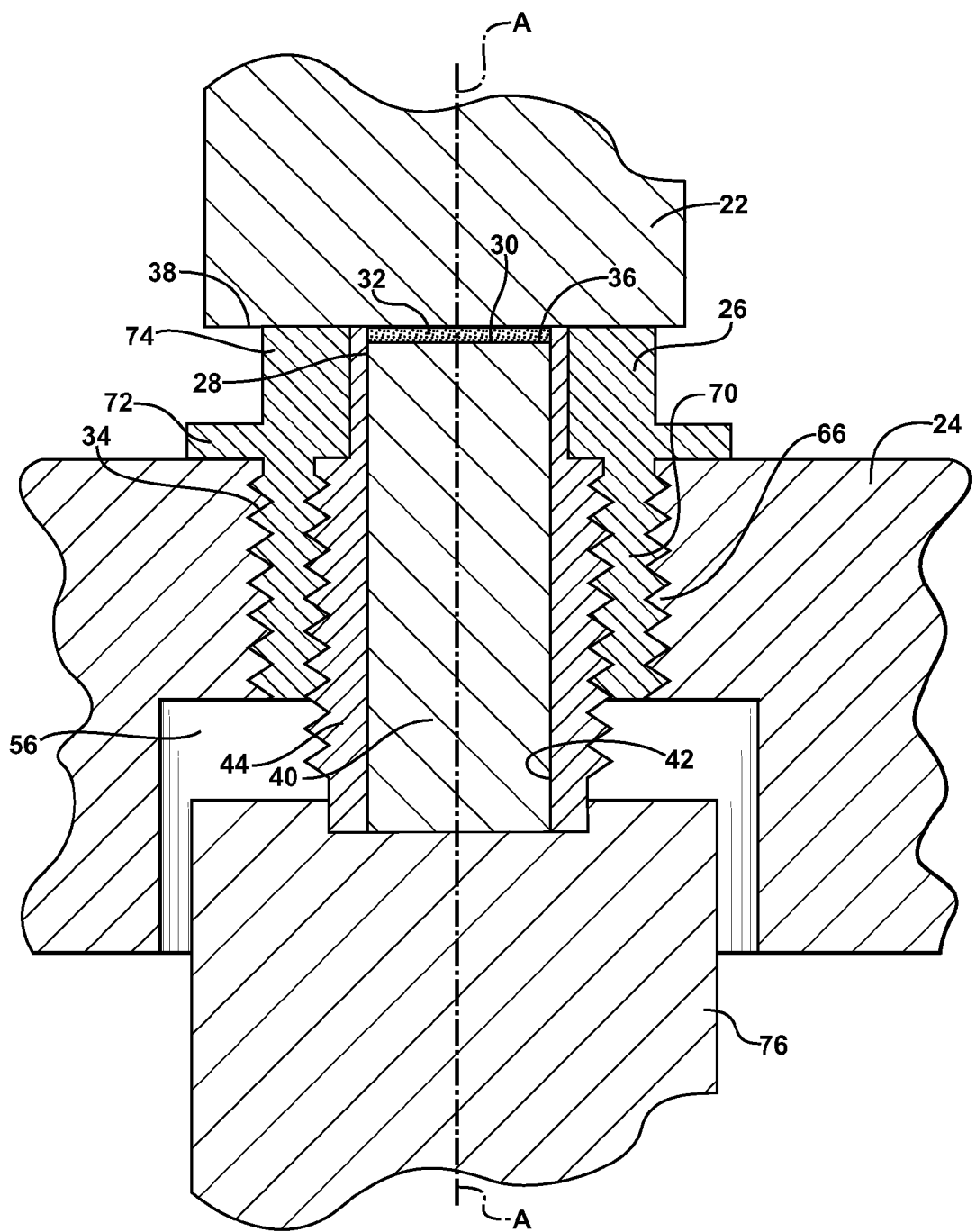
FIG. 5 is a cross-sectional view of the third embodiment of the fixture wherein the base includes a hollow insert engaged with the base and wherein the rod is received by and rotationally moveable and axially translatable relative to the hollow insert.

Alternatively, as shown in FIG. 5, the base 24 defines the bore 34 through the base 24 and the rod 26 is recessed into the base 24 presenting the bonding surface 30 recessed in the base 24 for forming a pocket 36 defined by the bonding surface 30 and the base 24 to receive adhesive 32. Specifically, the base 24 presents a datum surface 38 and defines the bore 34 through the datum surface 38. The pocket 36 receives the adhesive 32 such that the adhesive 32 is pooled in the pocket 36. The adhesive 32 fills the pocket 36 such that the adhesive 32 is level with the datum surface 38 and contacts the workpiece 22 when the workpiece 22 is located on the datum surface 38.

Preferably, the rod 26 includes a core 40 being capable of transmitting radiant energy. Specifically, the core 40 presents the bonding surface 30, i.e., the bonding surface 30 is capable of transmitting radiant energy. Preferably, the adhesive 32 is a light activated adhesive 32 curable by radiant energy transmitted from a radiant energy delivery system through the core 40 to the light activated adhesive 32. Specifically, the radiant energy is transmitted from the radiant energy delivery system through the bonding surface 30 to the light activated adhesive 32. Preferably the core 40 is cylindrical including a cylindrical surface 42. For example, as shown in FIG. 1, a stationary light beam is emanated from the radiant energy delivery system to the core 40. The stationary light beam either passes directly through the bonding surface 30 or indirectly after bouncing off the cylindrical surface 42 of the core 40.

The core 40 is preferably made of a material that is strong, hard, and stiff, and has radiation transmittive properties in the UVA to near infrared wavelengths. The term radiation transmittive properties refers to a material's ability to optically transmit light or radiant energy. Specifically, the core 40 is made from a translucent material. More specifically, the core 40 is made from a material selected from the group consisting of sapphire, diamond, single crystal silicon dioxide, ruby, cubic zirconia, and zirconium oxide. For example, the core 40 is made of random orientation, TiO2 free, sapphire. Sapphire is advantageous due to its high stiffness, high strength, high hardness, and ability to transmit light in the UVA to near infrared wavelengths. Additionally, sapphire has a high index of refraction ($\approx 1.76$).

The rod 26 includes an exterior portion 44 partially surrounding and coupled to the core 40 and made from a different material than the core 40. For example, with the rod 26 being cylindrical as shown in FIG. 1, the exterior portion 44 surrounds a portion of the cylindrical side of the core 40. The exterior portion 44 is coupled to the core 40 such that the core 40 is immoveable relative to the exterior portion 44. For example, the exterior portion 44 may be formed from metal such as steel.

As shown in FIG. 1, the fixture 20 includes at least one locator pin 46 extending from the base 24. Preferably, the fixture 20 includes a plurality of locator pins 46. The locator pins 46 are spaced relative to each other on the base 24 such that the placement of the workpiece 22 relative to the base 24 is guided by the locator pins 46. In other words, the locator pins 46 enable consistent placement of the workpiece 22 relative to the base 24 such that the manufacturing process is consistent between a plurality of workpieces 22. When the rod 26 is moved relative to the base 24, the locator pins 46 provide support to maintain the workpiece 22 in place relative to the base 24. The locator pins 46 may be removable prior to the manufacturing process to maximize access to the workpiece 22. In such a configuration, the locator pins 46 may be reassembled prior the movement of the rod 26 relative to the base 24 to maintain the workpiece 22 in place relative to the base 24.

The rod 26 supports the workpiece 22. Alternatively, as shown in FIG. 5, the base 24 supports the workpiece 22. Alternatively, as shown in FIG. 1, the fixture 20 includes a plurality of support posts 48. The support posts 48 support the workpiece 22 relative to the fixture 20. In such a configuration, the support posts 48 extend slightly further from the base 24 than does the rod 26 and the adhesive 32 on the bonding surface 30 extends slightly further from the base 24 than do the support posts 48. When the workpiece 22 is disposed on the support posts 48, the adhesive 32 bridges between the bonding surface 30 and the workpiece 22.

The fixture 20 may include pusher pins moveable relative to the base 24 to exert a force on the workpiece 22 to move the workpiece 22 relative to the base 24 and the bonding surface 30. For example, the motor 76 such as a pneumatic motor, a hydraulic motor, or an electric motor is coupled to the pusher pins to move the pusher pins. Alternatively, a hand tool is used to move the pusher pins. Specifically, the pusher pins exert force on the workpiece 22 and create stress in the adhesive bond between the bonding surface 30 and the workpiece 22 to destroy the adhesive bond.

Figure 2:
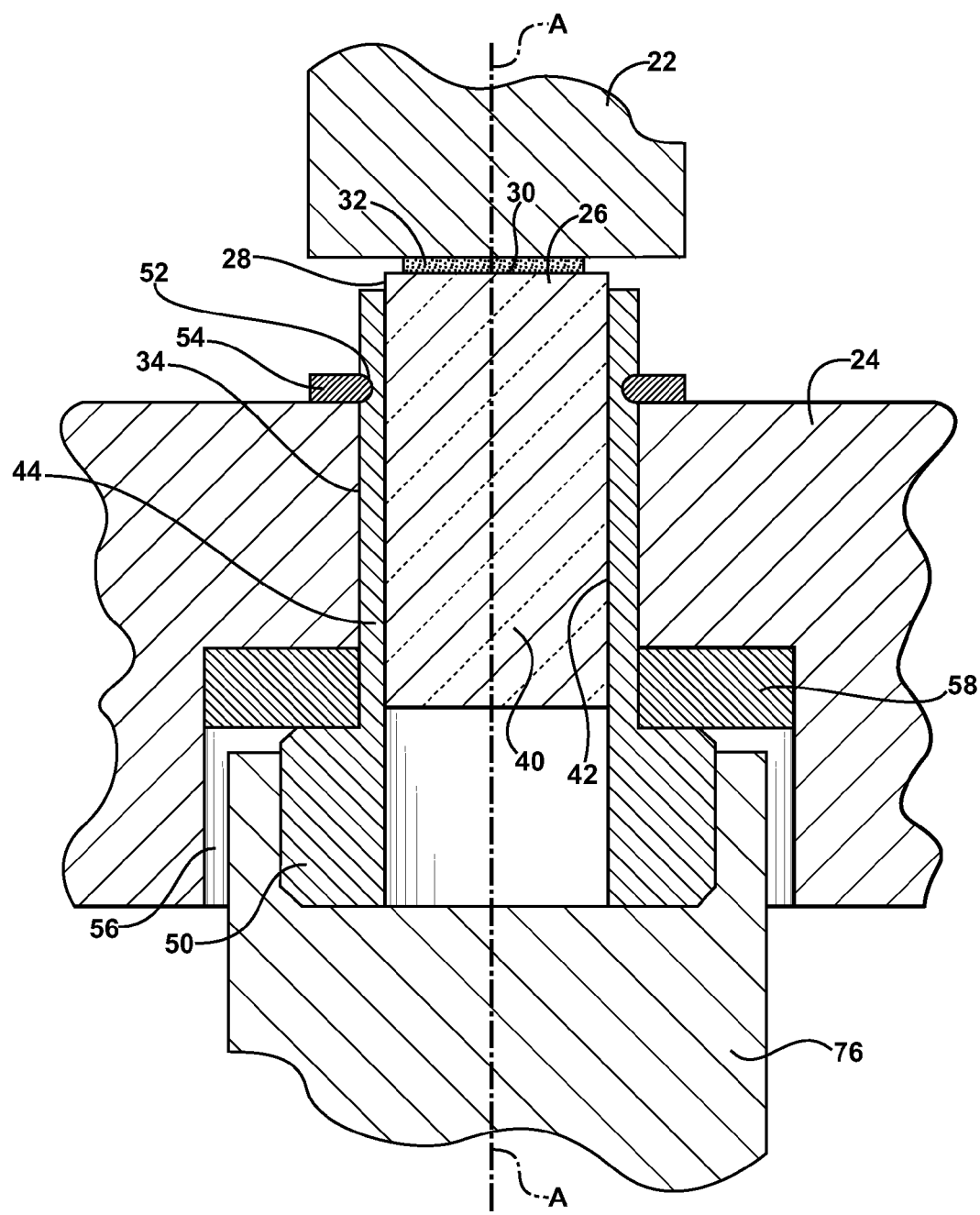
FIG. 2 is a cross-sectional view of a first embodiment of the fixture wherein the rod is rotationally moveable relative to the base.

In a first embodiment of the fixture 20, the rod 26 is rotatable about the axis A relative to the base 24. Rotation of the rod 26 relative to the base 24 is an adhesive bond destroying motion. Specifically, as shown in FIG. 2, the rod 26 is rotatable about the axis A in the bore 34. For example, the motor 76 such as a pneumatic motor, a hydraulic motor, or an electric motor is coupled to the rod 26 to rotate the rod 26 about the axis A relative to the base 24. Alternatively, a hand tool, such as a screw driver, is used to rotate the rod 26 about the axis A.

As shown in FIG. 2, the rod 26 includes a head 50 opposite the bonding surface 30 on the rod 26. The rod 26 defines a groove 52 spaced opposite from the head 50 relative to the base 24 and a snap ring 54 is engaged the groove 52. The head 50 and the snap ring 54 are sized larger than the bore 34 for rotatably maintaining the rod 26 in the bore 34.

Specifically, the base 24 defines a counterbore 56 being concentric with the bore 34. The base 24 receives the head 50 of the rod 26 in the counterbore 56. Preferably, the rod 26 includes a rotational bearing 58 disposed in the counterbore 56 between the head 50 and the base 24. The rotational bearing 58 enables the rod 26 to freely rotate relative to the base 24.

Figure 3:
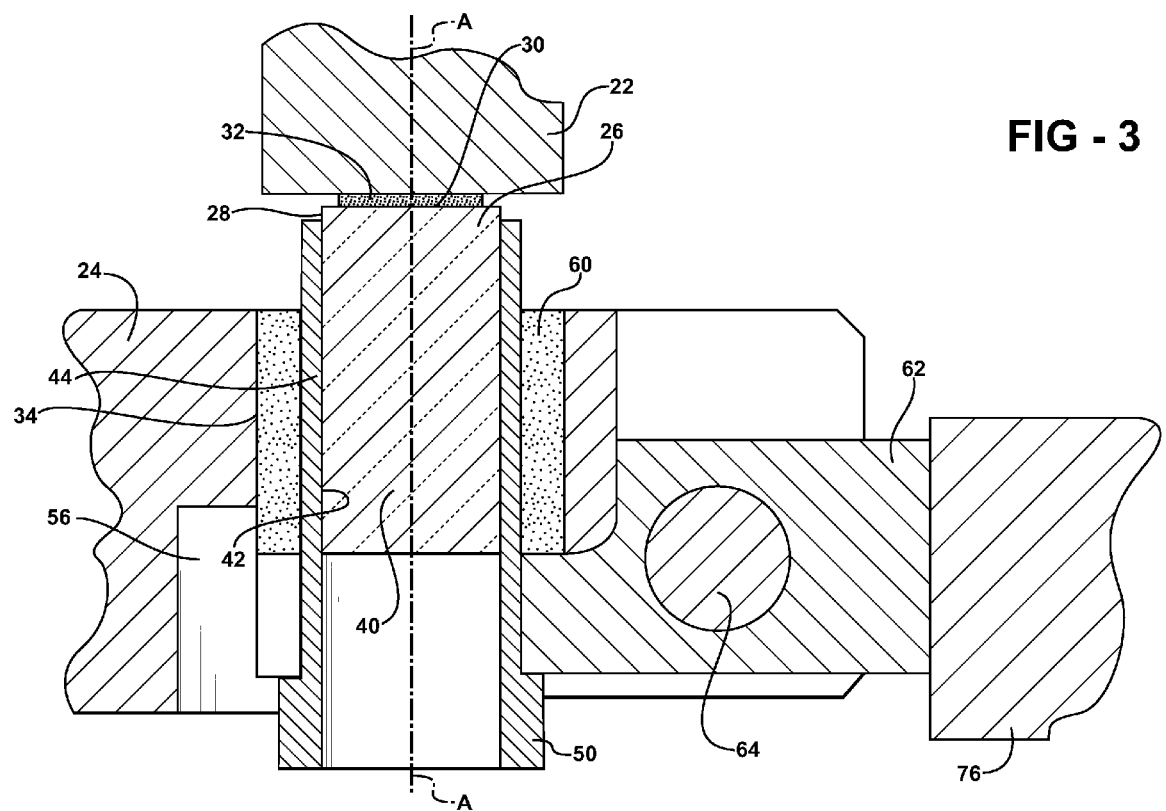
FIG. 3 is a cross-sectional view of a second embodiment of the fixture wherein the rod is axially translatable relative to the base.

In a second embodiment of the fixture 20, the rod 26 is linearly translatable relative to the base 24 along the axis A. Specifically, as shown in FIG. 3, the rod 26 is linearly moveable along the axis A in the bore 34. For example, the motor 76 such as a pneumatic motor, a hydraulic motor, or an electric motor is coupled to the rod 26 to linearly translate the rod 26 along the axis A relative to the base 24. Alternatively, a hand tool is used to linearly translate the rod 26 along the axis A. More specifically, a linear force may be applied to the head 50 of the rod 26 to linearly translate the rod 26 relative to the base 24 along the axis A.

Preferably, the base 24 includes a linear bearing 60 immovably engaged in the bore 34 and slideably engaged with the rod 26. The linear bearing 60 enables the rod 26 to freely move relative to the base 24 in the bore 34.

For example, and as shown if FIG. 3, the fixture 20 includes a lever 62 coupled to the rod 26. Specifically, the lever 62 is disposed in the counterbore 56 between the head 50 of the rod 26 and the base 24. The lever 62 extends from the rod 26 and is pivotal about a pivot point 64 spaced from the rod 26 for translating said rod 26 relative to said base 24 in said bore 34.

Figure 4:
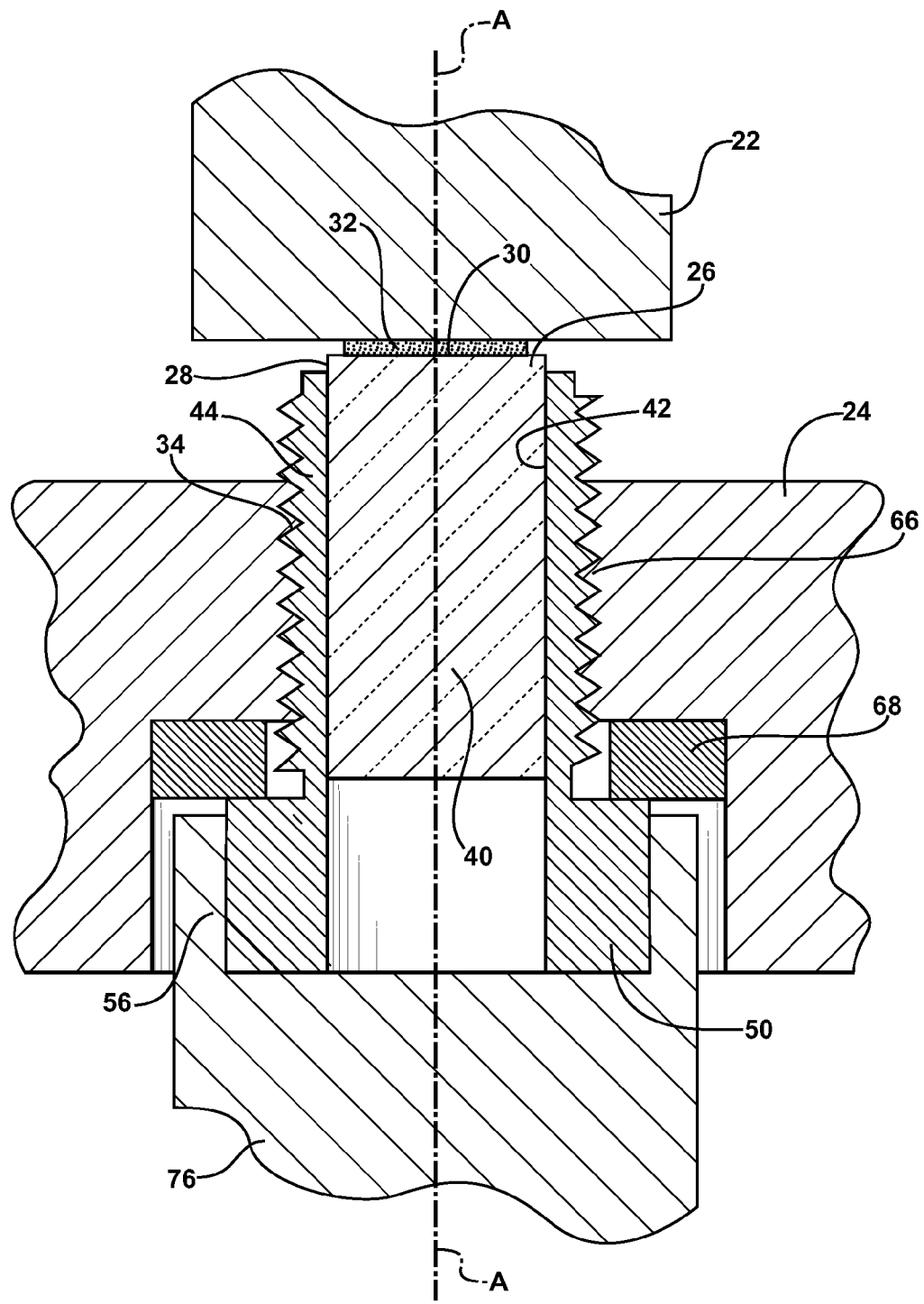
FIG. 4 is a cross-sectional view of a third embodiment of the fixture wherein the rod is both rotationally moveable and axially translatable relative to the base.

In a third embodiment of the fixture 20, the rod 26 is both rotatable about the axis A relative to the base 24 and linearly translatable along the axis A relative to the base 24. For example, as shown in FIG. 4, the base 24 defines the bore 34 and threads 66 in the bore 34. The rod 26 is threaded and threadedly engages the bore 34. The threads 66 in the bore 34 correspond to the threaded rod 26 such that the rod 26 is rotatable relative to the threads 66.

Preferably, the threads 66 are shallow. Shallow threads 66 increase the mechanical advantage of the rod 26 as compared to deep threads 66 by increasing the rotational stress on the adhesive 32 relative to the normal stress on the adhesive 32.

For example, the motor 76 such as a pneumatic motor, a hydraulic motor, or an electric motor is coupled to the rod 26 to rotate the rod 26 relative to the threads 66. Alternatively, a hand tool, such as a screw driver, is used to rotate the rod 26 relative to the threads 66. More specifically, rotational force may be applied to the head 50 of the rod 26 to rotate the rod 26 relative to the threads 66.

As shown in FIG. 4, the rod 26 includes a washer 68. Specifically, the washer 68 is disposed in the counterbore 56 between the head 50 of the rod 26 and the base 24. The washer 68 is sized to control the spacing between the base 24 and the bonding surface 30.

Alternatively, a hollow insert 70 is externally and internally threaded and threadedly engages the threads 66 in the bore 34. The rod 26 threadedly engages the hollow insert 70.

The hollow insert 70 includes an external flange 72 for engaging the base 24 and a shaft 74 extending from the base 24. The rod 26 extends partially into the hollow insert 70 and extends partially from the insert such that the bonding surface 30 is spaced from the hollow insert 70.

Alternatively, the hollow insert 70 presents the datum surface 38 spaced from the base 24 for locating and supporting the workpiece 22 relative to the base 24. The rod 26 is recessed into the insert presenting the bonding surface 30 recessed in the insert for forming the pocket 36 defined by the bonding surface 30 and the insert to receive adhesive 32. In other words, the pocket 36 receives the adhesive 32 such that the adhesive 32 is pooled in the pocket 36. The adhesive 32 fills the pocket 36 such that the adhesive 32 is level with the datum surface 38 and contacts the workpiece 22 when the workpiece 22 is located on the datum surface 38.

In a fourth embodiment of the fixture 20, the rod 26 is capable of vibrating relative to the base 24 and relative to the workpiece 22. For example, the motor 76 such as a pneumatic motor, a hydraulic motor, or an electric motor is coupled to the rod 26 to vibrate the rod 26 relative to the base 24. Alternatively, a hand tool is used to vibrate the rod 26 relative to the base 24.

The method of holding the workpiece 22 on the fixture 20 includes the step of adjoining the adhesive 32 to the bonding surface 30. The method further includes adhering the adhesive 32 to the bonding surface 30 and to the workpiece 22 to create the adhesive bond between the bonding surface 30 and the workpiece 22 to hold the workpiece 22 during the manufacturing process. Specifically, the step of adhering the adhesive 32 is further defined as positioning the workpiece 22 in contact with the adhesive 32. Preferably, the adhesive 32 is adjoined to the bonding surface 30 prior to the step of adhering the adhesive 32 to the bonding surface 30. Specifically, after the adhesive 32 is adjoined to the bonding surface 30, the workpiece 22 is positioned in contact with the adhesive 32.

The method further includes the step of displacing the bonding surface 30 relative to the base 24 and relative to the workpiece 22 to destroy the adhesive bond between the bonding surface 30 and the workpiece 22. In other words, the displacement of the bonding surface 30 relative to the base 24 mechanically debonds the workpiece 22 from the bonding surface 30. Because the bonding surface 30 is displaced relative to the base 24 and the workpiece 22, the workpiece 22 is quickly and easily debonded from the fixture 20. Specifically, the step of moving the bonding surface 30 relative to the base 24 and the workpiece 22 results in stress on the adhesive 32 to destroy the adhesive bond.

The method is advantageous in that the workpiece 22 is maintained in place during the manufacturing process without the requirement of clamps which can undesirably deform the workpiece 22. The method also provides for a mechanical debonding of the workpiece 22 from the fixture 20 while reducing the possibility of damaging the workpiece 22 during debonding. In other words, the method eliminates the need for a hand-held tool, such as a hammer or a pry-bar, to come in direct contact with the workpiece and apply force directly to the workpiece. The use of a hand-held tool to apply force by direct contact to the workpiece 22 with the hand tool to move the workpiece 22 relative to the fixture 20 has a tendency to cause permanent deformation or fracture of the workpiece 22. Specifically, the hand-held tool is formed from a material harder than the workpiece 22 and the hand-held tool dents, scratches, and/or cuts the surface of the workpiece 22. The use of the hand-held tool also creates torsion in the workpiece 22, i.e. twists the workpiece 22 about a torsional axis of the workpiece 22, leading to deformation or fracture of the workpiece 22. In addition, difficulties arise in applying force with a hand-held tool to a consistent region of each of the workpieces 22. Application of force to a weak region of the workpiece 22 leads to fracture of the workpiece 22. The method also reduces the time to debond as compared to methods such as chemical debonding.

After a workpiece 22 is subjected to the manufacturing process and debonded from the bonding surface 30, the manufactured workpiece 22 is removed from the fixture 20. Subsequently, a workpiece 22 that has not yet been subjected to the manufacturing process is disposed on the fixture 20 and the method holding the workpiece 22 on the fixture 20 is repeated. For example, after the workpiece 22 has been removed from the fixture 20, the bonding surface 30 of the rod 26 is scrubbed to remove any excess adhesive 32.

The method further includes the step of maintaining the workpiece 22 stationary relative to the base 24 such that the adhesive bond is destroyed when the bonding surface 30 is displaced relative to the base 24 and the workpiece 22. In other words, because the workpiece 22 is maintained stationary relative to the base 24, displacement of the bonding surface 30 relative to the base 24 results in displacement of the bonding surface 30 relative to the workpiece 22. This displacement of the bonding surface 30 relative to the workpiece 22 is an adhesive bond destroying motion. The step of maintaining the workpiece 22 stationary is further defined as blocking the workpiece 22 against the at least one locator pin 46. Preferably, the workpiece 22 is maintained stationary relative to the base 24 during the manufacturing process and during the displacement of the bonding surface 30 relative to the base 24.

The step of adhering the adhesive 32 is further defined as curing the adhesive 32 such that the adhesive 32 creates the adhesive bond between the bonding surface 30 and the workpiece 22, i.e. bonding to the bonding surface 30 and the workpiece 22. For example, with light activated adhesive 32, the step of curing the adhesive 32 is further defined as exposing the adhesive 32 to radiant energy. Specifically, the step of exposing the adhesive 32 to radiant energy is further defined as transmitting ultraviolet light through the core 40 to the adhesive 32. It should be appreciated that the adhesive 32 may also be curable by, for example, chemical or thermal activation.

Preferably, the step of adjoining the adhesive 32 to the bonding surface 30 is further defined as disposing the adhesive 32 on the bonding surface 30 and maintaining the cylindrical side of the rod 26 and the cylindrical surface 42 of the core 40 substantially free of adhesive 32. In other words, the adhesive 32 is preferably contained entirely on the bonding surface 30. Specifically, the light activated adhesive 32 is preferably contained entirely on the bonding surface 30 such that the light activated adhesive 32 is exposed to the radiant energy transmitted through the bonding surface 30. In other words, light activated adhesive 32 that flows from the bonding surface 30 to the cylindrical side of the rod 26 or the cylindrical surface 42 of the core 40 is not cured by the radiant energy transmitted through the bonding surface 30.

The method is advantageously applied to the use of light activated adhesives 32. It is known in the art to use light activated adhesives 32 to hold the workpiece 22 during the manufacturing process. Generally, the light activated adhesive 32 is exposed to radiant energy to cure the light activated adhesive 32 and create an adhesive bond between the workpiece 22 and the fixture 20. After the manufacturing process, the light activated adhesive 32 is again exposed to radiant energy to decompose the adhesive bond between the workpiece 22 and the fixture 20. When used with light activated adhesives 32, the method of the present invention eliminates the need for expose the light activated adhesive 32 to radiant energy after the manufacturing process. The method is advantageous in that the mechanical debonding provided by the method is quicker than the decomposition of the adhesive bond by radiant energy.

The method is employable in combination with the decomposition of the adhesive bond with radiant energy. In other words, on occasion, the radiant energy may be used to partially decompose the adhesive bond and create a weakened bond. The method of the present invention is employed to destroy the weakened bond.

In the first embodiment of the method, the step of displacing the bonding surface 30 is further defined as rotating the rod 26 about the axis A of the rod 26. Rotation of the rod 26 relative workpiece 22 creates rotational stress on the adhesive bonded to the bonding surface 30 and the workpiece 22. The rotational stress destroys the adhesive bond between the bonding surface 30 and the workpiece 22. Specifically, the step of rotating the rod 26 is further defined as exerting rotational force on the head 50 of the rod 26. For example, the motor 76 or a hand tool such as a screw driver, may be used to exert rotational force on the head 50.

Specifically, the rotation of the rod 26 about the axis A results in high concentration of stress on the adhesive 32 disposed on the bonding surface 30 furthest from the axis A. As the stress increases on the adhesive 32 furthest from the axis A, the adhesive bond of the adhesive 32 furthest from the axis A is destroyed leaving stress to be borne by the adhesive 32 closer to the axis A.

In the second embodiment of the method, the step of displacing the bonding surface 30 is further defined as linearly translating the rod 26 in the bore 34 along the axis A of the rod 26. Linear translation of the rod 26 relative to the workpiece 22 creates normal stress on the adhesive bonded to the bonding surface 30 and the workpiece 22. The normal stress destroys the adhesive bond between the bonding surface 30 and the workpiece 22.

Specifically, the translation of the rod 26 along the axis A results in high concentration of stress on the adhesive 32 disposed on the bonding surface 30. As the stress increases on the adhesive 32, the adhesive bond of the adhesive 32 is destroyed.

Specifically, the step of linearly translating the rod 26 is further defined as exerting a force on the lever 62. Exerting force on the lever 62 pivots the lever 62 about the pivot point 64 to linearly translate the rod 26 relative to the base 24. The lever 62 provides a mechanical advantage such that the linear translation of the rod 26 relative to the workpiece 22 destroys the adhesive bond between the bonding surface 30 and the workpiece 22.

In a third embodiment of the method, the step of displacing the bonding surface 30 is further defined as both rotating the rod 26 about the axis A of the rod 26 and translating the rod 26 along the axis A of the rod 26. Specifically, the step of displacing the adhesive 32 receiving surface is further defined as rotating the rod 26 relative to the threads 66 in the bore 34 of the base 24. Rotating the rod 26 relative threads 66 creates rotational stress and normal stress on the adhesive bonded to the bonding surface 30 and the workpiece 22. The rotational stress and normal stress destroys the adhesive bond between the bonding surface 30 and the workpiece 22.

Specifically, the rotation of the rod 26 about the axis A results in high concentration of stress on the adhesive 32 disposed on the bonding surface 30 furthest from the axis A. Additionally, the linear translation of the rod 26 along the axis A results in a high concentration of stress across the entire adhesive bond. As the stress increases on the adhesive 32, the adhesive bond of the adhesive 32 is destroyed.

In a fourth embodiment of the method, the step of displacing the bonding surface 30 is further defined as vibrating the rod 26 relative to the base 24 and relative to the workpiece 22. More specifically, the step of vibrating the rod 26 is further defined as transferring vibratory forces to the rod 26 with the motor 76 such as a pneumatic motor, a hydraulic motor, or an electric motor is coupled to the rod 26 to vibrate the rod 26 relative to the base 24. Alternatively, the step of vibrating the rod 26 is further defined as transferring vibratory forces to the rod 26 with a hand tool.

The vibration of the rod 26 destroys the adhesive bond between the bonding surface 30 and the workpiece 22. Specifically, the vibration causes thermal softening and/or mechanical fatigue of the adhesive bond.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of holding a workpiece on a fixture including a base and a rod presenting a bonding surface and being received by and moveable relative to the base; said method comprising the steps of:
   adjoining adhesive to the bonding surface;
   adhering the adhesive to the bonding surface and to the workpiece to create an adhesive bond between the bonding surface and the workpiece to hold the workpiece during a manufacturing process; and
   displacing the bonding surface relative to the base and relative to the workpiece with at least one of a rotational movement and a vibrational movement to destroy the adhesive bond between the bonding surface and the workpiece.

2. The method as set forth in claim 1 wherein the rod extends along an axis and wherein the step of displacing the bonding surface is further defined as rotating the rod about the axis of the rod.

3. The method as set forth in claim 2 wherein the rod includes a head opposite the bonding surface on the rod and wherein the step of displacing the rod with the rotational movement is further defined as exerting rotational force on the head.

4. The method as set forth in claim 1 wherein the rod extends along an axis and wherein the step of displacing the bonding surface further includes linearly translating the rod in the bore along the axis of the rod.

5. The method as set forth in claim 4 wherein the fixture includes a lever coupled to the rod and pivotal about a pivot point spaced from the rod and wherein the step of linearly translating the rod is further defined as exerting a force on the lever.

6. The method as set forth in claim 1 wherein the rod extends along an axis and wherein the step of displacing the bonding surface is further defined as rotating the rod about the axis of the rod and translating the rod along the axis of the rod.

7. The method as set forth in claim 6 wherein the base defines a bore and threads in the bore and the rod is threaded and disposed in the bore and wherein the step of displacing the bonding surface is further defined as rotating the rod relative to the threads in the bore of the base.

8. The method as set forth in claim 1 wherein the step of adhering the adhesive is further defined as positioning the workpiece in contact with the adhesive.

9. The method as set forth in claim 1 wherein the step of adhering the adhesive is further defined as curing the adhesive.

10. The method as set forth in claim 9 wherein the adhesive is further defined as light activated adhesive and the step of curing the adhesive is further defined as exposing the adhesive to radiant energy.

11. The method as set forth in claim 10 wherein the rod includes core presenting the bonding surface and being capable of transmitting radiant energy and the step of exposing the adhesive to radiant energy is further defined as transmitting ultraviolet light through the core to the adhesive.

12. The method as set forth in claim 1 further including the step of maintaining the workpiece stationary relative to the base such that the adhesive bond is destroyed when the bonding surface is displaced relative to the base and the workpiece.

13. The method as set forth in claim 12 wherein the fixture includes at least one locator pin and the step of maintaining the workpiece stationary is further defined as blocking the workpiece against the at least one locator pin.

14. A fixture for holding a workpiece during a manufacturing process, said fixture comprising:
a base; and
a rod received by and configured to be moveable relative to said base with at least one of a rotational and a vibrational movement and including a proximal end presenting a bonding surface for receiving an adhesive such that the adhesive establishes an adhesive bond extending between and bonding to said bonding surface and the workpiece;
said bonding surface being moveable with said rod relative to said base with at least one of said rotational movement and said vibrational movement for displacing said bonding surface relative to the workpiece to destroy the adhesive bond between said bonding surface and the workpiece.

15. The fixture as set forth in claim 14 wherein said rod extends along an axis and is rotatable about said axis relative to said base.

16. The fixture as set forth in claim 15 wherein said base defines a bore with said rod disposed in said bore and rotatable about said axis in said bore.

17. The fixture as set forth in claim 16 wherein said rod includes a head opposite said bonding surface on said rod sized larger than said bore and defines a groove spaced opposite from said head relative to said base and includes a snap ring sized larger than said bore engaging said groove for rotatably maintaining said rod in said bore.

18. The fixture as set forth in claim 17 wherein said base defines a counterbore being concentric with said bore and receiving said head of said rod and wherein said rod includes a rotational bearing disposed in said counterbore between said head and said base.

19. The fixture as set forth in claim 14 wherein said rod extends along an axis and is linearly translatable relative to said base along said axis.

20. The fixture as set forth in claim 19 wherein said base defines a bore with said rod disposed in said bore and linearly moveable along said axis in said bore.

21. The fixture as set forth in claim 20 wherein said base includes a linear bearing immovably engaged in said bore and slideably engaged with said rod.

22. The fixture as set forth in claim 20 further comprising a lever coupled to the rod and pivotal about a pivot point spaced from the rod for translating said rod relative to said base in said bore.

23. The fixture as set forth in claim 14 wherein said rod extends along an axis and is rotatable about said axis relative to said base and linearly translatable along said axis relative to said base.

24. The fixture as set forth in claim 23 wherein said base defines a bore and threads in said bore and said rod is threaded and threadedly engages said bore.

25. The fixture as set forth in claim 23 wherein said base defines a bore and threads in said bore and includes a hollow insert being externally and internally threaded and threadedly engaging said threads in said bore and said rod being threaded and threadedly engaged in said hollow insert.

26. The fixture as set forth in claim 25 wherein said hollow insert includes an external flange for engaging said base and a shaft extending from said base presenting a datum surface spaced from said base for locating and supporting the workpiece relative to said base.

27. The fixture as set forth in claim 14 wherein said rod includes a core being capable of transmitting radiant energy such that the adhesive is a light activated adhesive curable by radiant energy transmitted from a radiant energy delivery system through said core to the light activated adhesive.

28. The fixture as set forth in claim 27 wherein said core is made from a material selected from the group consisting of sapphire, diamond, single crystal silicon dioxide, ruby, cubic zirconia, and zirconium oxide.

29. The fixture as set forth in claim 27 wherein said rod includes an exterior portion partially surrounding and coupled to said core and made from a different material than said core.

30. The fixture as set forth in claim 14 wherein said base defines a bore and said rod is disposed in said bore and extends from said base presenting said bonding surface spaced from said base.

31. The fixture as set forth in claim 14 wherein said base presents a bore through said base and said rod is disposed in said bore and recessed into said base presenting said bonding surface recessed in said base for forming a pocket defined by said bonding surface and said base to receive adhesive.

32. The fixture as set forth in claim 14 wherein said bonding surface is planar.

* * * * *